US012614410B2

(12) United States Patent
Covell et al.

(10) Patent No.: US 12,614,410 B2
(45) Date of Patent: Apr. 28, 2026

(54) REALTIME FACIAL BIOMETRIC FEEDBACK FOR DYNAMIC OPTIMIZATION OF ARTIFICIAL INTELLIGENCE OUTPUT

(71) Applicant: International Business Machines Corporation, Armonk, NY (US)

(72) Inventors: Jacob Thomas Covell, New York, NY (US); Pranay Sakhrani, Clarksville, TN (US); Elwood Jeff Hullinger, Salt Lake City, UT (US); Monique Kamali, Great Neck, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 18/432,877

(22) Filed: Feb. 5, 2024

(65) Prior Publication Data

US 2025/0252775 A1     Aug. 7, 2025

(51) Int. Cl.
*G06V 40/16*          (2022.01)
*G06V 10/764*        (2022.01)

(52) U.S. Cl.
CPC .......... *G06V 40/169* (2022.01); *G06V 10/764* (2022.01)

(58) Field of Classification Search
None
See application file for complete search history.

(56) References Cited

U.S. PATENT DOCUMENTS

| | | | | | |
|---|---|---|---|---|---|
| 10,268,682 | B2 * | 4/2019 | Chakra | ................. | G06F 40/253 |
| 10,621,422 | B2 * | 4/2020 | Kim | ........................ | G06T 13/40 |
| 10,650,492 | B2 * | 5/2020 | He | ......................... | G06N 3/045 |
| 10,733,422 | B2 * | 8/2020 | Rhee | ...................... | G06V 10/32 |
| 10,775,618 | B2 * | 9/2020 | Ilic | ........................... | G06T 17/00 |
| 10,902,243 | B2 * | 1/2021 | Wang | .................. | G06V 40/161 |
| 11,244,146 | B2 * | 2/2022 | Davis | ...................... | G06F 21/32 |

(Continued)

FOREIGN PATENT DOCUMENTS

CN          112464774  A        3/2021

OTHER PUBLICATIONS

"ChatGPT", https://en.wikipedia.org/wiki/ChatGPT, Wikipedia. org, retrieved from the internet on Jan. 30, 2024, 41 pages.

(Continued)

*Primary Examiner* — Anand P Bhatnagar
(74) *Attorney, Agent, or Firm* — Harrity & Harrity, LLP

(57) ABSTRACT

Mechanisms are provided for real-time modification of an interaction with an artificial intelligence (AI) computer model based on detected real-time user passive responses to content generated by the AI computer model. Sensor(s) record dynamic passive user responses while a user consumes an output from the AI computer model. A machine learning (ML) trained computer model analyzes user response in real time to classify the user response with regard to different levels of comprehension by the user or user emotional states. The ML model assigns user scores corresponding to the plurality of predetermined classifications to a portion of the output and pauses generation of the output if a threshold is exceeded. In response to pausing, a prompt specific to the portion of the output and the classification of the user reaction is generated. The output generation by the AI computer model is resumed from the portion of the output, in response to processing the generated prompt.

20 Claims, 5 Drawing Sheets

(56) References Cited

U.S. PATENT DOCUMENTS

| 11,386,701 | B2 * | 7/2022 | Rhee | G06V 20/647 |
|---|---|---|---|---|
| 11,468,288 | B2 * | 10/2022 | Anisimov | G06F 3/011 |
| 11,748,555 | B2 | 9/2023 | Tran | |
| 11,998,364 | B2 * | 6/2024 | De Brouwer | G06V 40/172 |
| 12,154,313 | B2 * | 11/2024 | Valstar | G06N 3/0464 |
| 12,354,028 | B2 * | 7/2025 | Smith | G06V 20/40 |
| 2016/0260108 | A1 | 9/2016 | Bracewell | |
| 2022/0188514 | A1 | 6/2022 | Thota et al. | |

OTHER PUBLICATIONS

"Prompt tuning for casual language modeling", https://huggingface.co/docs/peft/task_guides/clm-prompt-tuning, retrieved from the Internet on Jan. 30, 2024, 8 pages.

Agomuoh, Fionna , "Here's the ChatGPT word limit and how to get around it", https://www.digitaltrends.com/computing/easily-bypass-the-chatgpt-word-limit/#:~:text=ChatGPT%20was%20introduced%20to%20the,accuracy%2C%20context%2C%20and%20creativity, Mar. 17, 2023 retrieved from the Internet on Jan. 30, 2024, 9 pages.

Ajemera, Siddharth , "Emotionally Intelligent ChatBots—Part 1: Getting emotions from user's face", https://chatbotslife.com/emotionally-intelligent-chatbots-part-1-getting-emotions-from-users-face-4c07447dada8, electronically published on Dec. 13, 2017, retrieved from the Internet on Oct. 11, 2023, 11 pages.

Anonymously, "Information generation on-demand system", IP.com No. IPCOM000254588D, IP.com Electronic Publication Date: Jul. 13, 2018, 5 pages.

Devlin, Hannah , "Human-robot interactions take step forward with 'emotional' chatbot", https://www.theguardian.com/technology/2017/may/05/human-robot-interactions-take-step-forward-with-emotional-chatting-machine-chatbot, electronically published by the The Guardian on May 5, 2017 retrieved from the Internet on Oct. 11, 2023, 6 pages.

Lester, Brian et al., "Guiding Frozen Language Models with 13 Learned Soft Prompts", https://blog.research.google/2022/02/guiding-frozen-language-models-with.html?m=1#:~:text=To%20create%20a%20soft%20prompt,combined%20sequence%20into%20the%20model, electronically published Feb. 10, 2022, retrieved from the Internet on Sep. 30, 2023, 7 pages.

Lester, Brian et al., "The Power of Scale for Parameter-Efficient Prompt Tuning", Association for Computational Linguistics, Proceedings of the 2021 Conference on Empirical Methods in Natural Language Processing, Nov. 2021, 15 pages.

Martineau, Kim , "What is prompt-tuning?", https://research.ibm.com/blog/what-is-ai-prompt-tuning, ibm.com, electronically published Feb. 15, 2023, retrieved from the Internet on Jan. 30, 2024, 7 pages.

Ramesh, Aarushi , "The Advancement of Emotional Intelligence in Chatbots", https://discover.bot/bot-talk/emotion-ai-chatbots/, Oct. 9, 2019, 8 pages.

Razavi, Ali , "Exploring AUTO-PROMPT: A Novel Method for Zero-Shot Learning and Beyond", https://medium.com/@razavipour6/exploring-auto-prompt-a-novel-method-for-zero-shot-learning-and-beyond-3f84c2d0f9f0, May 17, 2023, retrieved from the Internet on Jan. 30, 204, 8 pages.

Roose, Kevin , "Don't Ban ChatGPT in Schools. Teach With It", https://www.seattletimes.com/business/technology/dont-ban-chatgpt-in-schools-teach-with-iU, Oct. 13, 2023, 6 pages.

* cited by examiner

100

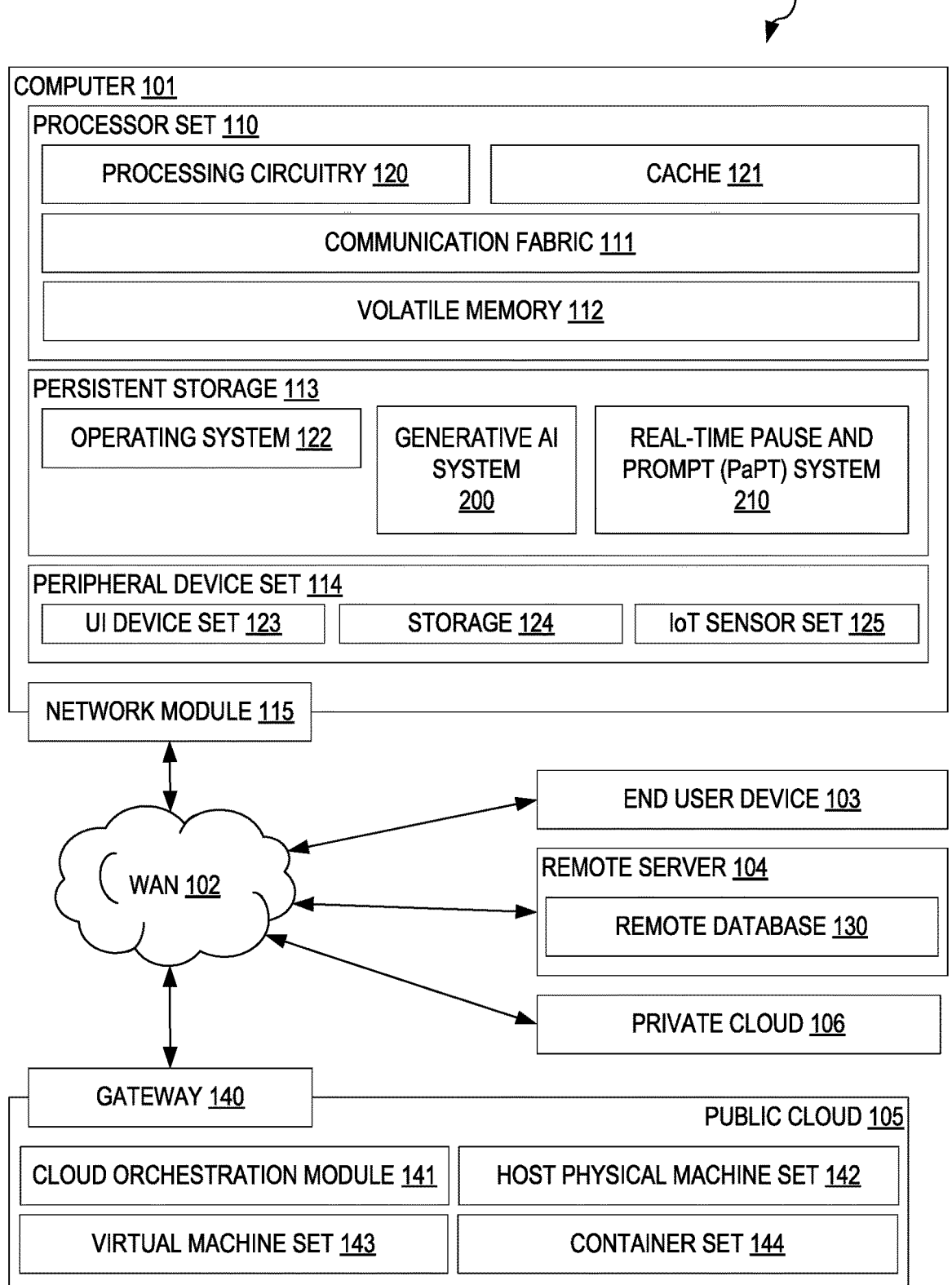

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122     GENERATIVE AI SYSTEM 200     REAL-TIME PAUSE AND PROMPT (PaPT) SYSTEM 210

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*FIG. 1*

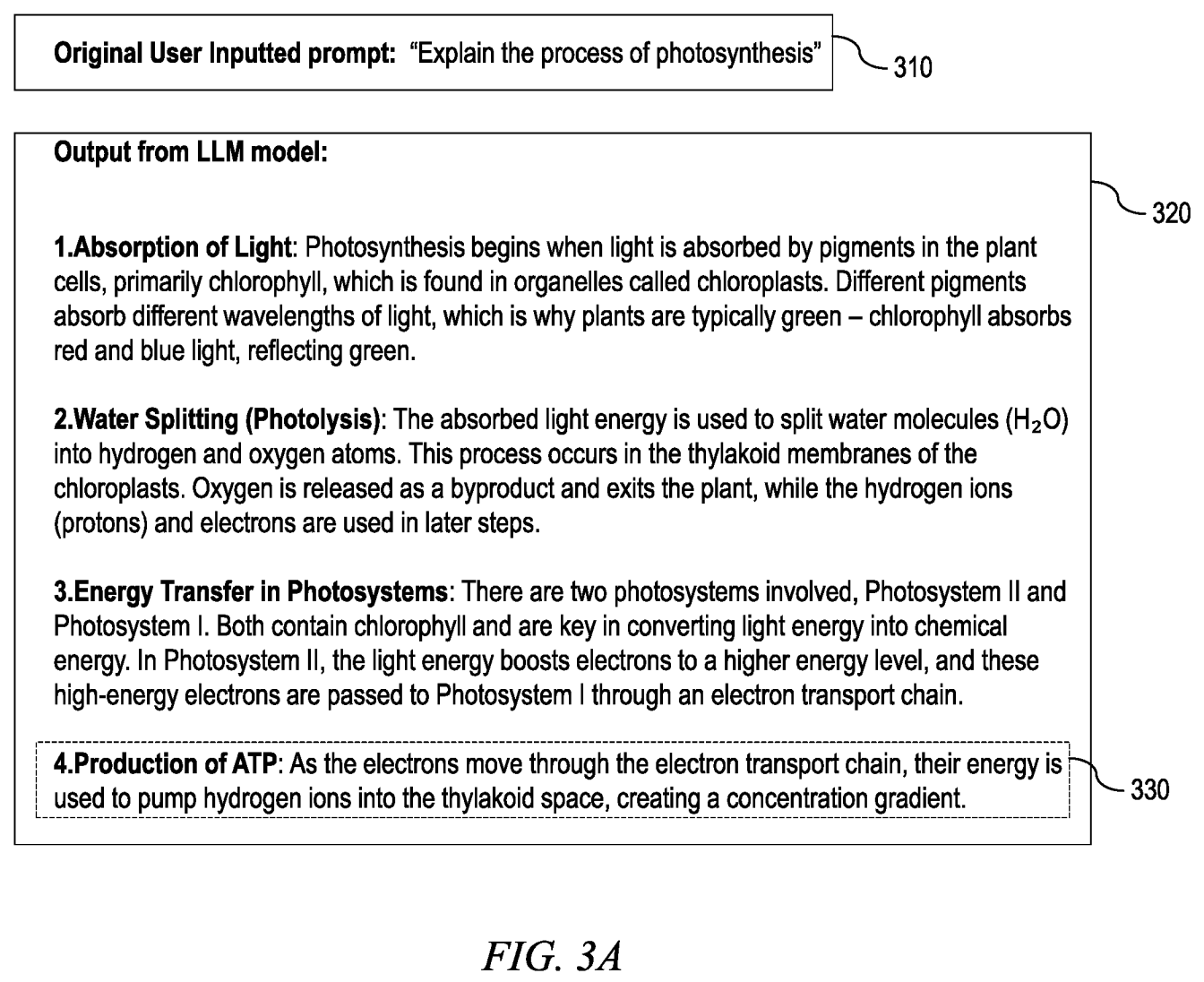

Original User Inputted prompt: "Explain the process of photosynthesis" — 310

Output from LLM model: — 320

1.Absorption of Light: Photosynthesis begins when light is absorbed by pigments in the plant cells, primarily chlorophyll, which is found in organelles called chloroplasts. Different pigments absorb different wavelengths of light, which is why plants are typically green – chlorophyll absorbs red and blue light, reflecting green.

2.Water Splitting (Photolysis): The absorbed light energy is used to split water molecules ($H_2O$) into hydrogen and oxygen atoms. This process occurs in the thylakoid membranes of the chloroplasts. Oxygen is released as a byproduct and exits the plant, while the hydrogen ions (protons) and electrons are used in later steps.

3.Energy Transfer in Photosystems: There are two photosystems involved, Photosystem II and Photosystem I. Both contain chlorophyll and are key in converting light energy into chemical energy. In Photosystem II, the light energy boosts electrons to a higher energy level, and these high-energy electrons are passed to Photosystem I through an electron transport chain.

4.Production of ATP: As the electrons move through the electron transport chain, their energy is used to pump hydrogen ions into the thylakoid space, creating a concentration gradient. — 330

*FIG. 3A*

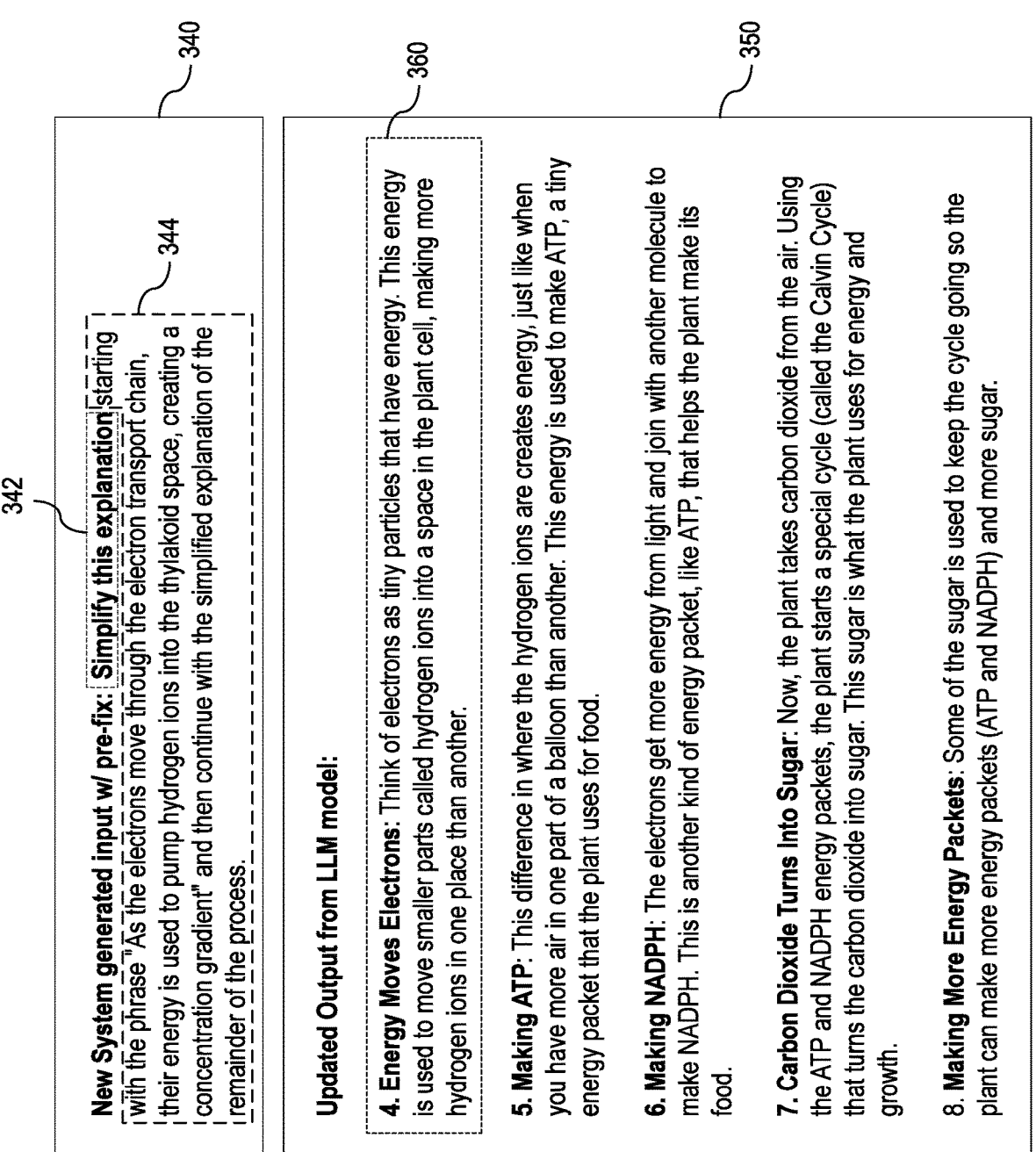

New System generated input w/ pre-fix: Simplify this explanation starting with the phrase "As the electrons move through the electron transport chain, their energy is used to pump hydrogen ions into the thylakoid space, creating a concentration gradient" and then continue with the simplified explanation of the remainder of the process.

340

344

342

Updated Output from LLM model:

4. Energy Moves Electrons: Think of electrons as tiny particles that have energy. This energy is used to move smaller parts called hydrogen ions into a space in the plant cell, making more hydrogen ions in one place than another.

5. Making ATP: This difference in where the hydrogen ions are creates energy, just like when you have more air in one part of a balloon than another. This energy is used to make ATP, a tiny energy packet that the plant uses for food.

6. Making NADPH: The electrons get more energy from light and join with another molecule to make NADPH. This is another kind of energy packet, like ATP, that helps the plant make its food.

7. Carbon Dioxide Turns Into Sugar: Now, the plant takes carbon dioxide from the air. Using the ATP and NADPH energy packets, the plant starts a special cycle (called the Calvin Cycle) that turns the carbon dioxide into sugar. This sugar is what the plant uses for energy and growth.

8. Making More Energy Packets: Some of the sugar is used to keep the cycle going so the plant can make more energy packets (ATP and NADPH) and more sugar.

REALTIME FACIAL BIOMETRIC FEEDBACK FOR DYNAMIC OPTIMIZATION OF ARTIFICIAL INTELLIGENCE OUTPUT

BACKGROUND

The present application relates generally to an improved data processing apparatus and method and more specifically to an improved computing tool and improved computing tool operations/functionality for dynamically optimizing artificial intelligence (AI) computer model output based on real-time facial biometric feedback.

Artificial Intelligence (AI) computer models, or simply AI models, have been developed for various applications. As these AI computer models have been developed over time, there is now a large range of AI computer models that organizations and users can use to process input data and generate results. This range of AI computer models ranges from relative non-complex AI models such as rules based engines, to moderately complex AI models such as shallow classifiers, convolutional neural networks (CNNs), and the like, to high complexity AI models, such as deep learning neural networks (DNNs), large language models (LLMs), and the like, which are trained on massive amounts of data to perform highly complex operations handling large diversities in input data.

Generative AI models are machine learning computer models that are trained to create new data rather than making predictions or classifications about a specific dataset. That is, a generative AI model is trained on a specific training data, but is trained to make additional data objects that resemble the training data. An early version of generative AI is the Markov chain which is used to generate a next word in a sentence by looking at previous words in the sentence. More modern version of generative AI may be found in systems such as ChatGPT (a trademark of OpenAI OPCO, LLC), generative adversarial networks (GANs), the transformer architecture available from Google, LLC of Mountain View, California, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for real-time modification of an interaction with an artificial intelligence (AI) computer model based on detected real-time user passive responses to content generated by the AI computer model. The method comprises, responsive to the user consuming an output from the AI computer model as it is generated in real-time, recording, by one or more sensors, a dynamic passive user response of the user. The method further comprises analyzing, by a machine learning trained computer model, the recorded dynamic passive user response in real time to classify the recorded dynamic passive user response with regard to a plurality of predetermined classifications corresponding to different levels of comprehension by the user or user emotional states. In addition, the method comprises assigning, by the machine learning trained computer model, user scores corresponding to the plurality of predetermined classifications to a portion of the output. The method also comprises, responsive to at least one user score of the assigned user scores exceeding a threshold score, pausing generation of the output by the AI computer model and, in response to pausing the generation of the output by the AI computer model, generating a prompt specific to the portion of the output and a level of comprehension classification or an emotional state classification of the user corresponding to the at least one user score. Furthermore, the method comprises resuming generating the output by the AI computer model, from the portion of the output, in response to the AI computer model processing the generated prompt.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system environment in which aspects of the illustrative embodiments may be implemented and at least some of the computer code involved in performing the inventive methods may be executed;

FIG. 3A is an example diagram of a generative AI system output in accordance with one illustrative embodiment;

FIG. 3B is an example diagram of a modified or updated output, of a targeted portion of the generative AI system output, generated in response to a prefix prompt generated by the real-time PaPT system in accordance with one illustrative embodiment.

DETAILED DESCRIPTION

Figure 2:
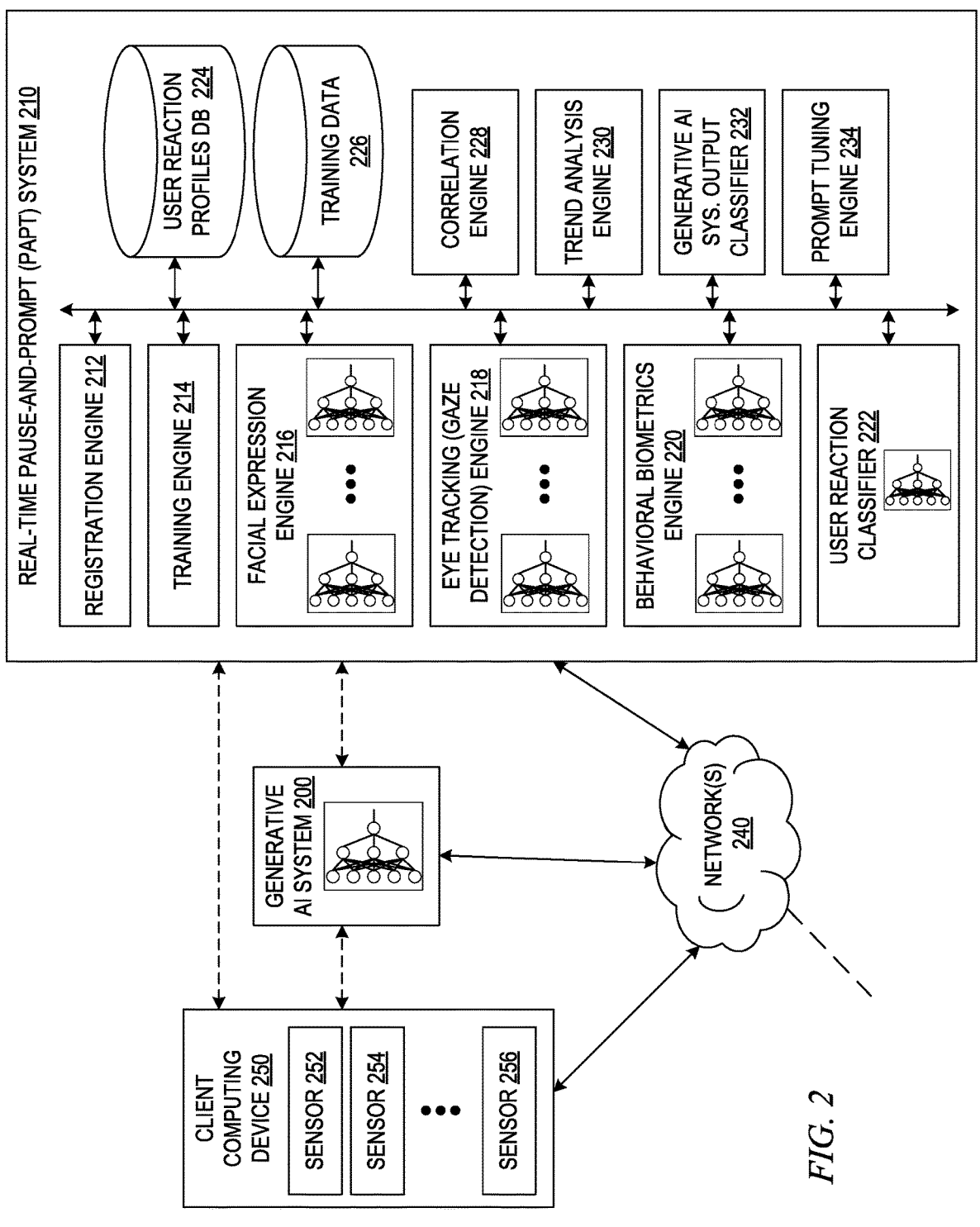
FIG. 2 is an example block diagram of the primary operational components of a real-time pause-and-prompt tuning (PaPT) system in accordance with one illustrative embodiment.

The illustrative embodiments provide an improved computing tool and improved computing tool operations/functionality for dynamically optimizing artificial intelligence (AI) computer model output based on real-time facial biometric feedback. The illustrative embodiments provide a specific technological improvement over existing AI computer models, and in accordance with some illustrative embodiments, specifically generative AI computer models, by providing a computer specific solution that tracks user eye movements and facial expressions in real-time to classify user reactions to generative AI computer model output, and use this real-time eye movement and facial expression feedback information to automatically modify the operation of the generative AI computer model to provide a more accurate and satisfactory output.

In the rapidly evolving field of AI, generative AI systems have shown immense potential in various applications ranging from language translation, content creation, to personal digital assistance. These generative AI systems generate content based on learned patterns and structures, often delivering impressive results. However, despite their advanced capabilities, generative AI systems often struggle to provide outputs that are consistently satisfying to all users due to the inherent complexity and subjectivity of human language understanding and communication.

A key challenge in this domain is the lack of real-time feedback in the interaction between users and the generative AI computer models (also referred to herein as the "generative AI" or "generative AI models"). Users can often encounter generative AI model-generated content that is complex, difficult to understand, or contextually inappropriate. Existing generative AI systems lack the ability to gauge the user's comprehension or emotional state in real-time as they interact with the generated content. This results in a one-size-fits-all approach that fails to account for the diverse needs, preferences, and emotional states of various users.

Moreover, the user's experience and satisfaction with the generative AI model-generated content can significantly impact their perception of the generative AI system's effectiveness and utility. This is especially crucial in applications where the generative AI system is expected to engage in a conversation or deliver personalized content to the user. In such scenarios, the inability to adapt the output based on real-time user feedback often leads to user dissatisfaction, disengagement, and frustration. Therefore, there is a pressing need for an innovative solution that can track and respond to user reactions in real-time, thereby optimizing the generative AI model's output for each individual user's needs and preferences.

The illustrative embodiments provide an improved computing tool and improved computing tool operations/functionality that is a specific solution to the above problems in existing AI systems, such as generative AI systems which will be used as the primary non-limiting example in the following description. While generative AI systems are the primary example, the mechanisms of the illustrative embodiments may be implemented with other AI systems as well without departing from the spirit and scope of the present invention. The improved computing tool and improved computing tool operations/functionality optimize the output of an AI system in real-time, via a "pause-and-prompt-tune method," based on user reactions, as determined by eye-tracking, facial expression recognition, behavioral biometrics, user profile data, and contextual and environmental analysis, all of which are calibrated through an initial user training exercise and leverage machine learning computer model technology, e.g., convolutional neural network (CNN), deep learning neural network (DNN), Long Short Term Memory (LSTM), or other machine learning computer model technology.

With the illustrative embodiments, a real-time pause and prompt tuning (PaPT) computing tool or system, and computing operations/functionality, are provided for performing real-time detection and classification, from analysis of these various feedback information, of a user's passive response to an output from the generative AI model. This response is referred to as "passive" in that the user is not explicitly providing the response as an input to the system, e.g., the response is not specifically intended by the user to respond to the generative AI model's output, but rather the PaPT computing tool captures this response from the user automatically without the user's explicit intervention and in some cases, without the user's specific knowledge. Thus, the illustrative embodiments detect confusion, frustration, or the like based on image captures and sensor data as input as opposed to direct input from the user specifying such confusion, frustration, or the like.

Not only are the facial expressions of the user analyzed, but the particular location, within the generative AI system's output, to which the facial expression is directed may be identified through the eye tracking mechanisms. In this way, the real-time PaPT system can track in real-time the portions of the generative AI output that the user is focusing their attention on, and correlating these locations with facial expressions which are classified into one or more of a plurality of predetermined facial expression classifications.

Based on the classification of the user's response by the real-time PaPT system, the real-time PaPT system may determine that the output by the generative AI system needs to be temporarily paused and the generative AI system is prompted, via a soft prompt or prefix prompt, to output a simplified version of the output. The simplified version of the output further breaks down the specific portion of the previous generative AI system's output focused on by the user when the facial expression was detected, i.e., the "targeted portion," into content that the user may find more understandable or satisfactory to the user. For example, in some cases, the real-time PaPT system may operate to cause the generative AI system to generate a concise summary of the targeted portion of the previous AI system output. This process may be repeated with the concise summary to determine a classification of the user's passive response to the concise summary to determine whether the concise summary is still unsatisfactory or the user's passive response indicates user satisfaction with the concise summary. In this way, the generative AI output may be dynamically and automatically modified based on detection and classification of user passive responses to the generative AI output and modifications to the generative AI output.

To further illustrate this example operation of the real-time PaPT system, consider a scenario in which Toby, an engineer, is using an AI-powered text generation system, i.e., a generative AI system, to assist with his work. As he interacts with the AI-powered text generation system, the real-time PaPT system uses its front-facing camera and sensors to track his eye movement and focus, as well as facial expressions, correlating these based on timestamps or the like. Toby begins to read a paragraph generated by the system about a complex engineering concept. The real-time PaPT system, using its eye-tracking capabilities, accurately tracks Toby's reading progress in real-time, while at substantially the same time monitors Toby's facial expressions via the images captured of Toby's face and one or more machine learning trained classification models for classifying facial features into one or more pre-determined classifications of emotional state, e.g., understanding, confusion, frustration, anger, etc.

Suddenly, Toby's brows furrow in confusion at a particularly technical portion of the text being presented to Toby by the AI-powered text generation system. The real-time PaPT system immediately recognizes this change in his facial expression and classifies it as confusion with, for example, a confidence score of 83.2, using the real-time PaPT system's trained machine learning computer model(s) for facial expression recognition and classification. This confidence score or probability may be compared to one or more threshold scores/probabilities to determine if the confidence is such that it is determined that Toby is experiencing the corresponding emotional state, e.g., if the score/probability is above the 80-point threshold, then the corresponding emotional state is determined to be present. As a result of the score/probability being equal to or above the threshold, the real-time PaPT system temporarily pauses the generation of outputs by the AI-powered text generation system, and engages a prompt-tuning engine. Leveraging this immediate user feedback, the prompt-tuning engine develops an enhanced soft prompt or prefix prompt which prompts the AI-powered text generation system, or generative AI model, to output a simplified response which further breaks down the technical portion of text using analogies which help Toby better grasp the concept.

A soft prompts are learnable tensors concatenated with the input embeddings that can be optimized to a dataset. Hard prompts, on the other hand, are manually handcrafted text prompts with discrete input tokens. Soft prompts and Prefix prompts are part of soft prompt tuning and prefix tuning techniques used in machine learning to fine-tune computer models for specific tasks. Prefix tuning involves adding a specific prefix to input text to guide the computer model towards generate more accurate outputs. The main difference between prefix tuning and soft prompt tuning is that prefix tuning is used to generate something that is more accurate with the concept behind the prompt, while soft prompt tuning is directed to creating more divers outputs based on a more general prompt. For purposes of the present description, the illustrative embodiments will be described with regard to prefix tuning and prefix prompts, however the illustrative embodiments are not limited to such and soft prompt with soft prompt tuning may be used without departing from the spirit and scope of the present invention.

The AI-powered text generation system, in response to the prompt (prefix or soft) from the real-time PaPT system, simplifies the complex explanation and offers a concise summary instead. With the presentation of a more understandable explanation of the technical concept, Toby's expression eases, which may likewise be detected and classified by the mechanisms of the illustrative embodiments, and he continues to read, indicating to the real-time PaPT system that the adjustment was successful. As a result, the temporary pause is lifted and the AI-powered text generation system continues, with continued real-time monitoring by the real-time PaPT system. It should be noted that the real-time adjustment of the output from the AI-powered text generation system would not have been possible without the real-time PaPT system's capability to track, interpret, and respond to Toby's reactions (passive responses) dynamically, all of which are calibrated based on Toby's responses during an initial training phase of the real-time PaPT system, as described in greater detail hereafter. During this initial training phase, the machine learning computer models of the real-time PaPT system are trained on training data using Toby's specific responses to that training data such that the machine learning computer models may learn, over multiple instances of training data, Toby's specific facial cues corresponding to confusion, understanding, and other reactions or emotional states.

Thus, with the mechanisms of the illustrative embodiments, an improved computing tool and improved computing tool operations/functionality that provide real-time user feedback to generative AI system outputs. The real-time adjustment of generative AI system output based on user reactions can drastically improve user experience, making generative AI solutions more appealing to both existing and potential users. The real-time feedback can provide valuable data for training and refining the generative AI models of the generative AI system which enhances their accuracy, adaptability, and overall performance over time. In some illustrative embodiments, the generative AI system, enhanced with the real-time PaPT system of the illustrative embodiments, may be part of an AI driven personalized learning platform, a virtual assistant that can respond to user emotional states in real-time, or other implementations of generative AI solutions.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a real-time pause-and-prompt tuning (PaPT) system, which may be separate from, or integrated with, a generative AI system that generates outputs in real-time. The improved computing tool implements mechanism and functionality, such as the functionality of the generative AI system and the real-time PaPT system, which cannot be practically performed by human beings either outside of, or with the assistance of, a technical environment, such as a mental process or the like. The improved computing tool provides a practical application of the methodology at least in that the improved computing tool is able to improve the accuracy and satisfactory nature of generative AI system outputs by incorporating a real-time user feedback mechanism that is specifically based on user passive feedback information that is automatically and dynamically detected, classified, and correlated with portions of the generative AI system output.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as generative AI system 200 and real-time pause-and-prompt tuning (PaPT) system 210. In addition to generative AI system 200 and real-time PaPT system 210, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and generative AI system 200 and real-time PaPT system 210, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in generative AI system 200 and real-time PaPT system 210 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in generative AI system 200 and real-time PaPT system 210 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a generative AI system 200 and real-time PaPT system 210. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improvements to generative AI system outputs by providing a real-time user feedback mechanism that automatically and dynamically identifies a user's passive feedback and correlates it with portions of generative AI system outputs so as to automatically adapt the generative AI system outputs to the user's emotional state or response to the output.

FIG. 2 is an example block diagram of the primary operational components of a real-time pause-and-prompt tuning (PaPT) system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., voice/text inputs as part of a conversation with the generative AI system, the passive responses from facial expressions, and the like, and the resulting output may aid human beings, e.g., the generative AI system outputs may be used to convey information to the user. The invention is specifically directed to the automatically operating computer components directed to improving the way that generative AI systems operate to provide satisfactory outputs to users, and specifically provides automated real-time computer detection and classification of passive feedback from users while the user consumes generative AI system outputs so as to dynamically adapt the generative AI system outputs to the real-time passive feedback, which cannot be practically performed by human beings as a mental process and is not directed to organizing any human activity.

As shown in FIG. 2, the primary operational components comprise a generative artificial intelligence (AI) system 200 and a real-time pause-and-prompt tuning (PaPT) system 210. In some illustrative embodiments, the systems 200 and 210 may be separate from one another and may in fact be hosted on different computing systems from one another, e.g., system 200 may be on a first server or set of servers, and system 210 may be on a separate server or set of servers, where these different computing systems may be owned and/or operated by different entities. In other illustrative embodiments, the systems 200 and 210 may be integrated with one another, provided by the same entity, or any other suitable configuration for the particular situation. In one example embodiment, the systems 200 and 210 operate in conjunction with one another and are hosted by a cloud computing system accessible by users via their client computing devices and one or more data networks.

Thus, using the cloud computing implementation as an example, a user may make use of a client computing device 250, through which the user accesses the generative AI system 200 via the one or more data networks 240. For example, the user of the client computing device 250 may be engaged in a real-time voice and/or textual conversation with the generative AI system 200 with the generative AI system 200 providing real-time responses to user inputs, such as in the form of real-time text output generation, for example. The generative AI system 200 may perform natural language processing and AI analysis to provide natural language text responses to natural language textual inputs from the client computing device 250 such that a conversation occurs between the generative AI system 200 and the user of the client computing device 250. In some cases, using voice-to-text and text-to-voice conversion mechanisms, the conversation may occur using voice input and synthesized voice output.

The client computing device 250 is equipped with, or has in the vicinity of the client computing device 250, one or more sensors 252-256 of one or more types that are able to capture sensor data regarding the user of the client computing device 250. For example, these sensors 252-256 may comprise digital cameras, accelerometers, biometric monitoring sensors, and/or the like. In some illustrative embodiments, the sensors 252-256 comprise at least a digital camera which captures images of the facial features of the user of the client computing device 250 while the user interacts with the generative AI system 200 in real-time.

The generative AI computing system 200 may be any currently known or later developed generative AI computing system. The generative AI computing system 200 generates, in real-time, response to user inputs based on artificial intelligence based analysis user inputs and analysis of a large corpus of knowledge, e.g., knowledge bases, ontologies, websites, etc. One example of a generative AI computing system 200 with which the mechanisms of the illustrative embodiments may operate is the ChatGPT large language model (LLM) mentioned previously.

The real time pause-and-prompt tuning (PaPT) system 210 comprises a registration engine 212, a machine learning training engine 214, one or more machine learning computer models 216-222, user reaction profile database 224, training data storage 226, correlation engine 228, trend analysis engine 230, generative AI system output classifier 232, and prompt tuning engine 234. These elements operate in three main phases of operation, a registration phase, an initial training phase, and a real-time deployment phase of operation. These phase of operation will now be described in greater detail with reference to the operational components shown in FIG. 2 using an example implementation of a real-time conversational generative AI system 200 that uses natural language text inputs and natural language text outputs to carry on a conversation between the generative AI system 200 and a user of a client computing device 250.

During a registration phase of operation, a user of the client computing device 250 may log onto or otherwise access the generative AI system 200 via the one or more data networks 240 and "opt-in" to monitoring of the user via the one or more sensors 252-256. The one or more sensors 252-256 may monitor the user as the user interacts with the generative AI system 200 both during the initial training phase of operation and during the later real-time deployment phase of operation. The one or more sensors 252-256 may monitor one or more aspects of the user during these interactions, such as facial expressions, heart rate, pupil dilation, blood pressure, temperature, movements, gestures, whether the user shakes or moves the client computing device 250 in a manner indicative of an emotional state, or any other characteristic of the user that may be indicative of the user's emotional state when consuming the output from the generative AI system 200.

The user of the client computing device 250 registers, via the registration engine 212 of the real-time PaPT system 210, registers with the systems 200, 210 by providing user login credentials and other standard account registration information. In response to the user opting in to the operations of the real-time PaPT system 210, the registration engine 212 initializes and activates the necessary sensors 252-256 of the client computing device 250 when the user is logged into the systems 200, 210. For example, in response to the user logging into the systems 200, 210, the registration system 212 may activate a front-facing camera 252 of the client computing device 250 to capture real-time video feeds of the user and may initiate other necessary sensors as needed and if applicable, e.g., infrared sensors for low-light conditions to ensure high-quality eye and facial expression tracking, accelerometers 254 to classify behavior such as frustration when a user shakes the client computing device 250 or moves a peripheral device and/or cursor on the screen of the client computing device 250 violently, behavioral biometric sensors, e.g., temperature, blood pressure, heart rate, etc., for measuring indicators of different emotional states, and the like. As a result of the registration process, a user reaction profile is generated in the user reaction profile database 224. Initially, this user reaction profile will include only the initial registration information, but will thereafter be populated with configuration information for the particular user as may be learned through the initial training operations during the initial training phase of operation.

During the initial training phase of operation, before real-time interaction, the training engine 214 of the real-time PaPT system 210 conducts a training operation with the user of the client computing device 250. This training operation comprises the user being presented with simulated generative AI system 200 outputs by outputting multiple pre-configured prompts and responses, i.e., the training data 226. Each response tests changes in the user's facial express and behavioral biometrics as they are exposed to various grammatical, contextual, and semantic scenarios. For example, on response may begin logically but become more non-sensical by the end of the response. That is, the training data has training samples which comprise prompts and corresponding responses with portions of the responses being specifically designed to elicit different types of emotional responses from users, e.g., confusion, understanding, frustration, and the like. By correlating user responses when consuming these portions, the system can learn how the user demonstrates these emotional responses in their facial expressions, biometrics, and the like.

Thus, as the user consumes the simulated response, the sensors 252-256 capture images and behavioral biometric information from the user, e.g., sensing changes in facial expression and biometrics that may be indicative of different emotional states of the user as the user is consuming portions of the simulated generative AI system 200 output. The training engine 214 records the sensor data and correlates it with the ground truth emotional states for the corresponding portions of the simulated responses, e.g., if the user's eye gaze is focused on a portion of the simulated response associated with confusion, then the corresponding facial expression data and biometric data are assumed to be a representation of the user exhibiting confusion. This can be performed over multiple instances of training data which may include multiple instances of different portions of responses that elicit the same or different emotional states, e.g., multiple instances of confusion, multiple instances of frustration, etc. The patterns of facial expression data and biometric data over the instances for the same emotional state may be used to determine representations of these emotional states for the particular user and these learned patterns may be stored in association with the user reaction profile in the user reaction profile database 224. The learned patterns stored in the user reaction profile are then able to be used during real-time deployment phase operation to calibrate AI computer models to more accurately classify the user's responses to real-time generated outputs of the generative AI system 200, as discussed hereafter.

During the training operation, the real-time PaPT system 210 begins monitoring and tracking the user's eyes to determine the focus of the user's gaze, in real-time, on the various portions of the simulated generative AI system response. The training engine 212 may employ the eye tracking system 218 with its trained AI models and eye tracking algorithms to determine the locations within the simulated generative AI response that the user is focusing on from one point in time to another. The eye tracking system 218 and its algorithms and models are used to determine which specific words, images, or the like, the user is currenting viewing/reading and how long the user's gaze is directed to those words, images, or the like.

In parallel, the training engine 212 employs the facial recognition system 216 and its AI models and algorithms to analyze the facial expressions of the user in real-time as the user is consuming, i.e., the user's eye focus is on, the various portions of the generative AI response, e.g., the images, words, etc. The facial recognition system 216 may utilize a convolutional neural network (CNN) or other machine learning trained artificial intelligence computer model to identify key facial features, e.g., eyebrows, eyes, mouth, nose, etc., and apply facial expression analysis to classify the user's real-time emotional state based on these facial features, e.g., confusion, frustration, surprise, happiness, dissatisfaction, etc. Similarly, this parallel operation may include the biometric analysis engine 220 obtaining various behavioral biometrics from corresponding sensors 256 while the user's eye gaze is on the various portions of the generative AI response, and classifying the biometric data into similar classifications of real-time emotional state.

The user reaction classification engine 222 operates on each of these inputs, i.e., facial expression classifications and behavioral biometric classifications, to generate a user reaction classification specifying an emotional state for the particular instance in time during the real-time monitoring. Essentially, the user reaction classification engine 222 operates with the facial recognition system 216 and biometric analysis engine 220 to implement an ensemble AI computer model mechanism with the user reaction classification engine 222 generating a single classification based on a combination of the classifications from the AI computer models of the ensemble. This user reaction classification may be correlated with the eye gaze information to correlate user reaction classifications with particular portions of the simulated generative AI system responses. In this way, the user's facial expressions and biometric patterns may be correlated with particular user reactions, i.e., emotional states.

The real-time PaPT system 210 maintains an active user reaction profile in the profile database 224 by logging the user's facial expressions associated with the specific portions of the simulated generative AI system responses and uses machine learning with trend analysis from the trend analysis engine 230 to train and configure an instance of the facial recognition engine 216, biometric analysis engine 220, and user reaction classifier 222 AI computer models for the particular user. The machine learning with trend analysis operates to build a user profile for the user which considers multiple factors which ultimately contribute to the user's reaction to a specific portion of output content. Over time, the real-time PaPT system 210 identifies trends and learns what sort of outputs are optimal for the specific user. For example, these learned trends may be with regard to reading level, vernacular, setting/environment of the user, stylistic preferences, or the like.

For example, with regard to reading level, the real-time PaPT system 210 knows specific attributes of outputted text, such as topic, reading level—$7^{th}$ grade, etc. If the outputted text is about the topic of photosynthesis and provided at the $7^{th}$ grade reading level, and is well received by the user, i.e., the system identifies understanding/satisfaction above a certain threshold, or does not identify confusion or frustration, then this may be positive feedback used in a learning loop for the real-time PaPT system 210 to learn that the user is comfortable with the topic of photosynthesis and a $7^{th}$ grade reading level. This information may be stored in the user profile and moving forward, the real-time PaPT system 210 may assume that the user is satisfied learning similar topics at a $7^{th}$ grade reading level.

Similarly, with vernacular, the real-time PaPT system 210 may use similar analysis to determine, over time through such trend analysis and correlation of terms in outputs with user reactions, that the user gets confused by terms outside their specific vernacular. Moreover, such trend analysis can be used to identify user preferences with regard to styles of outputs, e.g., more informal tones versus formal tones. Furthermore, such trend analysis can determine the settings and/or environments in which the user prefers different types of outputs, e.g., more receptive to formal/business type tones during working house when their location is at their work office building, versus more informal tones during non-work hours, e.g., the weekend, when they are at a home location. Such trend analysis can further benefit from periodic direct feedback from the user, e.g., asking the user specifically if they liked certain characteristics of the generated output, e.g., "Did you like the tone of this response?", "Did you understand this response?", etc.

Thus, through the training of the real-time PaPT system 210, a user reaction profile is generated in the database 224 with AI model configuration information for configuring instances of the AI models of the real-time PaPT system 210. During the real-time phase of operation, instances of the AI models are configured for the user of the user device 250 in response to the user logging onto the generative AI system 200 and real-time PaPT system 210 based on the retrieved user reaction profile from the user reaction profile database 224.

During the real-time phase of operation, instances of the AI models of the systems 216-222 are configured based on the retrieved user reaction profile 224 and activates the sensors 252-256 of the client computing device 250 for capturing real-time reaction information from the user of the client computing device 250. The user of the client computing device 250 interacts with the generative AI system 200, such as via a natural language voice/text exchange, e.g., by entering a natural language textual question or sentence into an interface of the generative AI system 200 and receiving a responsive output from the generative AI system 200 that attempts to answer the question or respond to the sentence in a natural language voice/text responsive output.

The generative AI system output classifier 232 of the real-time PaPT system 210 performs natural language processing and classification of text to determine various aspects of the real-time voice/text output provided by the generative AI system 200. That is, the classifier 232 may determine a topic or subject matter of the output for each portion of the output generated by the generative AI system 200. This is performed at substantially a same time as the generative AI system 200 outputs the response to the user via the client computing device 250 and while the sensors 252-256 are sensing data regarding the user's reaction to the generative AI system 200 output and determines the user's eye gaze location or focus.

The sensor 252-256 data is provided to the real-time PaPT system 210 which uses the configured AI models of the systems 216-222 to classify the user's reaction to the generative AI system 200 output. For example, the user reaction classifier 222, based on the analysis performed by the systems 216-220 and their outputs that are input to the classifier 222, determines scores or probability values for each of a plurality of different possible emotional states or reactions of the user, e.g., confusion 89.3, dissatisfaction 60.2, satisfaction 40.0, etc. These scores or probability values are output to the prompt tuning engine 234.

The prompt tuning engine 234 compares the scores or probability values in real-time to one or more pre-defined thresholds, which may be preset to default values and later modified by the user for a desired sensitivity. Logic is implemented in the prompt tuning engine 234 for determining when to initiate prompt tuning based on the scores/probability values and their relationship to the one or more pre-defined thresholds. For example, if certain emotional states or reactions have a score equal to or higher than a corresponding threshold, then prompt tuning may be initiated. In other cases, if more than one of a particular set of emotional states or reactions are equal to or above different thresholds, then prompt tuning may be initiated.

As an example, logic may be provided that specifies that if the confusion score is equal to or greater than 80, then prompt tuning is triggered by the prompt tuning engine 234. Similarly, as another example, if dissatisfaction score is equal to or greater than 86, then prompt tuning is triggered. Moreover, in some illustrative embodiments, logic may specify that if confusion is greater than 50 and dissatisfaction is greater than 50, then prompt tuning is triggered. As yet another example, logic may specify that regardless of the scores for other emotional states or reactions, if satisfaction score is equal to or greater than 70, then prompt tuning is not triggered.

If a condition of the logic of the prompt tuning engine 234 is satisfies that causes prompt tuning to be initiated, then the prompt tuning engine 234 is engaged and the real-time generation of outputs by the generative AI system 200 is temporarily paused. The prompt tuning engine 234 generates a prompt, e.g., a prefix prompt or soft prompt, which enhances the generated output to better match the intent/understanding of the user. The prompt tuning involves taking the best cues, or prompts, and inputting them into the generative AI system 200 to give the generative AI system task-specific context, where these prompts can be extra words introduced, AI generated values introduced into the generative AI system's AI model(s) embedding layer, or the like. These cues or prompts may be stored in a data structure configuring the prompt tuning engine 234, and may correlate specific classifications of user reactions, e.g., confusion, frustration, anger, etc., with corresponding cues/prompts for the automatic generation of a modified prompt for processing by the generative AI system 200, e.g., "Simplify the explanation" (for confusion) or "provide less polarizing/neural response" (for anger).

With the mechanisms of the illustrative embodiments, in order to perform the prompt tuning operation and generate the prompt that is sent to the generative AI system 200 for providing a modified output or response, the prompt tuning engine 234 constructs the prompt from the original user generated hard prompt, i.e., the user input that caused the generative AI system 200 to generate the portion of the responsive output, i.e., the target location as determined from the eye gaze location information correlated with the classified emotional state or reaction of the user. In addition, the original generative AI system 200 output leading up to the pause point is also used to generate the prompt. This allows the prompt tuning engine 234 to incorporate the original output into the prompt such that the modified output continues seamlessly from a contextual standpoint. The user reaction profile may also be provided to the prompt tuning engine 234 for use in generating the prompt.

In addition, the portion of the output response, i.e., the portion at the target location, is used by the prompt tuning engine 234 to determine what command/request to include in the prompt based on the determined user emotional state or reaction from the user reaction classifier 222. Different requests/commands may be associated with different emotional states or reactions. For example, if it is determined that the user is "confused" the prompt may be generated requesting a summary or simplified output or which provides additional explanation or context. If it is determined that the user has a dissatisfied emotional state or reaction, the prompt tuning engine 234 may generate a prompt that requests alternative interpretations of user intent from the original hard prompt. In this way, the generative AI system 200 addresses the original hard prompt from a different perspective. If the user is determined to have a satisfied emotional state or reaction, then the real-time PaPT system 210 may record the characteristics of the target location for future reference to continue delivering satisfactory results.

Thus, for example, different predetermined classifications may be established, e.g., different buckets, such as confusion, angry, satisfied/understanding, etc. The scoring with regard to these different classifications or buckets may be compared to corresponding threshold values, which may be the same or different depending on the particular different classifications. For example, if a reaction is classified as confusion with a score of 87, and a threshold value of 70 is associated with confusion, then the score being above the threshold may trigger a corresponding prefix prompt to be generated, e.g., "Simplify this explanation to the $7^{th}$ grade reading level, using the user profile to identify which reading level is optimal for this user. Similarly, if a reaction is classified as anger with a score of 92, and a threshold value of 65 being associated with anger, then a prefix prompt may be triggered of the time "Provide less polarizing/more neutral response, with the system identifying the specific portion, e.g., phrase/topic, of the output that caused the anger and toning down that portion in a modified output. As another example, if the reaction is classified as satisfied with a score of 78, with a threshold of 70, then no prefix prompt is necessary and thus, no prefix prompt is generated.

Having generated the prompt, e.g., prefix prompt or soft prompt, the prompt tuning engine 234 restarts the real-time operation of the generative AI system 200 such that optimized output seamlessly continues from the target location, i.e., the section of text at which the confusion/dissatisfaction was detected by the mechanisms of the illustrative embodiments. In this way, the user experience is relatively seamless as the operation of the real-time PaPT system 210 is obfuscated from the user of the client computing device 250 and is a "behind-the-scenes" operation. The restart causes the generative AI system 200 to process the prompt and thereby generate additional explanatory or simplified output to thereby provide a modified output response to the user of the client computing device that will be more satisfactory to the user.

This process may be repeated with the modified output response so that continued real-time evaluation of the user's reactions to the output of the generative AI system 200 may be determined and appropriate action taken to increase the satisfaction of the user with the operation of the generative AI system 200 when needed. Thus, the operation of the real-time PaPT system 210 during the real-time phase of operation is an ongoing continuous operation with pauses being implemented in response to detection of emotional states or reactions that require further modification of the output of the generative AI system 200 to increase user satisfaction.

In some illustrative embodiments, the real-time PaPT system 210 can provide, via the output provided to the client computing device 250 from the generative AI system 200, a visual notification, such as highlighted text with a link, or the like, which describes which part of the output from the generative AI system 200 was deemed as being associated with different emotional states or reactions by the user, e.g., meeting or exceeding the corresponding thresholds for the various emotional states/reactions of confusion, dissatisfaction, etc. The user may then manually interact with a user interface to provide feedback as to the correctness/incorrectness of the corresponding classification of emotional state/reaction for those portions of the output. For example, each portion may have a "thumbs up/down" user interface element that the user can select to provide user feedback confirming or disagreeing with the corresponding classification of the user's emotional state/reaction for that portion of the output. This user feedback may be provided back to the real-time PaPT system 210 which may then adjust the configuration settings for the AI models as stored in the user reaction profile so as to reduce incorrect classifications of emotional state/reactions.

In some illustrative embodiments, the real-time PaPT system 210 can provide, via the output provided to the client computing device 250 from the generative AI system 200, a "sidebar glossary" with relevant links and the like, which includes the modified output, e.g., the explanation of certain concepts in the original output of the generative AI system 200 (which is still displayed on the client computing device 250), as opposed to pausing and adjusting the full response of the generative AI system 200. Thus, the user is able to view the original output or response from the generative AI system 200 as well as additional content that is specifically generated using the prompt mechanisms of the illustrative embodiments.

In some illustrative embodiments, the real-time PaPT system 210 may further be configured to perform non-real-time responses via deferred fine tuning of the AI models for each user. Essentially, the training engine 214 of the real-time PaPT system 210 can operate to fine-tune the AI models of the systems 216-222 per user after the original output of the generative AI system 200 is fully generated. In such embodiments, the real-time PaPT system 210 may not "pause and prompt" so as to adjust the original output, but rather may update the user's reaction profile based on the analysis of how the user responded to certain portions of the generated response and ensure that future responses were optimized to better serve the user.

That is, the training engine 214 of the real-time PaPT system 210 may integrate the user's emotional state/reaction classifications into the generative AI system 200 by associating identified facial expressions with specific elements of the generative AI system's output (e.g., a specific phrase or sentence). This information may be used as an additional feedback input to the generative AI system 200 to adjust operational parameters of one or more AI models of the generative AI system 200 based on the user reactions. For example, if a user frequently exhibits signs of confusion when long sentences are used, the system adjusts the generative AI system 200 to produce shorter, simpler sentences.

The real-time PaPT system 210 may continuously learn and update the learning of the generative AI system 200 using reinforcement learning techniques, where the reinforcement signal is derived from the user's emotional state/reactions as classified by the systems 216-222 of the real-time PaPT system 210. Over time, the systems 200, 210 refine their understanding of the user's preferences and reactive behavior, leading to more effective adjustments of the generative AI system 200 output. Moreover, users can provide explicit feedback in addition to the real-time PaPT system 210 monitoring of emotional state/reactions, with this user explicit feedback being used as additional inputs to adjust the generative AI system 200 outputs.

It should be appreciated that the above are examples of just some embodiments of the present invention. Many other embodiments may be implemented based on one or more of the above illustrative embodiments as a core, and which are likewise intended to be within the spirit and scope of the present invention. For example, in some additional embodiments, the mechanisms of the present invention may operate using brain-computer interface technology in which sensors are attached to or implanted in a user and are used to sense various biometric conditions of the user and provide output data indicative of these biometric conditions. This brain-computer interface technology can provide such biometric information which can then be used to gauge a user's reaction to stimuli, such as the output of the generative AI system 200. Similarly, embodiments of the present invention may make use of user wearable technology, such as heart rate monitors, skin conductance sensors, eyewear that tracks eye motions and focus locations, etc. These wearable technologies can provide additional data indicative of the user's eye gaze focus or location as well as emotional state or reactions of the user.

In some illustrative embodiments, the systems 200 and 210 may utilize voice-to-text and text-to-voice technology which includes voice tone analysis. The voice tone analysis provides additional inputs for detecting an emotional state or reaction by the user by looking at voice tone characteristics, such as volume, pitch, etc., to determine if the user is confused, dissatisfied, frustrated, etc.

In some illustrative embodiments, as touched upon above, gaze time analysis may also be utilized to not only determine what portions of an output the user is focusing on, but also how long the user focuses on different portions of the output. Longer gaze times may be indicative of confusion or deep thought on the part of the user and may be indicative of a need for additional explanation or simplified outputs to increase user satisfaction.

The various inputs, e.g., facial expression, gaze tracking, voice tone, user explicit feedback, etc., may all be provided as a multi-modal feedback. The multimodal feedback may be analyzed to create a more robust understanding of user reaction and update the AI models employed by the systems 200 and 210 to perform their operations and generate more accurate results for the particular user in a customized manner. As a result, user experience is improved and overall satisfaction with the operation of the generative AI system 200 is increased.

In some illustrative embodiments, the generative AI system output classifier 232 may be used to classify the original output generated by the generative AI system 200 and then correlate this classification with classifications and reactions stored in the user reaction profile for the user. For example, the system 210 may store in the user reaction profile entries for each of a plurality of different classifications of output content, e.g., topics, subjects, etc., where these entries include the emotional state/reaction the user has to portions of output classified in these different classifications. Thereafter, when encountering a new output by the generative AI system 200, the portions of the output may be classified and the user reaction profile used to predict the user's reaction to the new output based on their prior reactions to prior outputs of a similar classification.

It should be appreciated that while some biometric information is mentioned above, the illustrative embodiments are not limited to only the biometric information specifically mentioned and any other suitable biometric information that may be indicative of a user's emotional state and/or reaction to output from the generative AI system 200 may be used without departing from the spirit and scope of the present invention. For example, other biometric information that may be used in addition to or in replacement of the biometric information mentioned above includes blink rate, pupil dilation, brainwave activity (e.g., through EEG devices or the like), etc., which may provide a more nuanced understanding of the user's emotional state and reactions to outputs.

In some illustrative embodiments, in determining the user's emotional state or reactions, the AI models of the systems 216-222 may take into consideration contextual information about the environment in which the user is present when consuming the output from the generative AI system 200. For example, background noise levels, lighting conditions, and the like, may all have a potential effect on the user's reaction to the output from the generative AI system 200. Sensors 252-256 may include environmental sensors that sense such additional contextual inputs which can then be evaluated with the other inputs by the AI models of the systems 216-222 when determining scores or probability values for the various predetermined emotional states or reactions. For example, if the environment has a relatively high level of background noise, the sensitivity of AI models for determining the user's reaction to be one of frustration or confusion may be lessened as a user is more likely to seem frustrated or confused because of distractions from noisy environments and not necessarily the content of the output generated by the generative AI system 200.

In some illustrative embodiments, in addition to providing outputs by the generative AI system 200 that include coloring or indicators of the various portions of the output and the corresponding emotional state or reaction classifications of the user, the illustrative embodiments may further include additional user feedback controls that allow the user to manipulate the output from the generative AI system 200 to provide user feedback. For example, user feedback controls may include controls for highlighting sections of the output as confusing, providing suggested alternative phrasing for portions of the output, or the like. This direct feedback may be combined with the real-time monitoring of the real-time PaPT system 210 to create an interactive feedback mechanism and collaborative AI experience through which the user may specify to the systems 200, 210 how future outputs should be modified to provide a more satisfactory output.

In some illustrative embodiments, as different portions of the generative AI system 200 are classified with regard to user reactions, an output-color-coded heatmap of the output may be generated based on these classifications. That is, the highlighting performed may highlight with different characteristics, e.g., color, font, opacity, etc., for different classifications of user reactions to these different portions, e.g., a first set of characteristics highlighting first portions which the user's reaction indicates satisfaction or understanding, second set of characteristics highlighting second portions which the user's reaction indicates confusion, third set of characteristics highlighting third portions which the user's reaction indicates frustration or anger, etc. This heatmap output may be presented to the user and/or provided to a provider of the generative AI system 200 as feedback for indicating where modification of the training of the generative AI system 200 may be needed.

FIG. 3A is an example diagram of a generative AI system output in accordance with one illustrative embodiment. As shown in FIG. 3A, an original user input prompt 310 may be of the type "Explain the process of photosynthesis". The generative AI system, using a large language model (LLM) or the like, presents the depicted output 320 describing the process of photosynthesis. While the user is consuming the output from the generative AI system, the user's facial expressions and eye gaze location are monitored by the mechanisms of the illustrative embodiments as discussed previously using facial expression analysis computer models and eye tracking algorithms. Assume that at a portion or location of the output 330, as identified by the eye tracking algorithms, the facial expression computer model(s) analyze the digital images of the user's face and classify the facial expression as being confusion having a score above a threshold value. That is, it is determined that the user is confused by the portion of the output 320 describing the electrons moving through the electron transport chain and their energy being used to pump hydrogen ions into the thylakoid space and creating a concentration gradient.

FIG. 3B is an example diagram of a modified or updated output, of a targeted portion of the generative AI system output, generated in response to a prefix prompt generated by the real-time PaPT system in accordance with one illustrative embodiment. As shown in FIG. 3B, in response to detecting the confusion response by the user as discussed in FIG. 3A, the real-time PaPT system pauses the output from the generative AI computer model, e.g., the LLM model, and generates a prefix prompt 340 based on the fact that confusion was detected and that the prefix prompt for confusion is to "simplify this explanation" 342. It should be appreciated, as mentioned previously, that there may be different prompts for different classifications of user reactions, e.g., confusion, frustration, anger, etc. These may be predefined in the real-time PaPT system such that when a classification is above the corresponding threshold, the corresponding prefix prompt is identified and generated.

As shown in FIG. 3B, the generated prompt 340 comprises the prefix prompt 342 for the corresponding classified user reaction, along with the specification 344 of the portion of the original output causing the generation of the prompt, e.g., the portion 330, and specifying the continuation of the generative AI output thereafter. In response to this generated prompt 340 being processed by the generative AI computer model, the updated or modified output 350 from the generative AI computer model, e.g., the LLM, is generated and output. The updated or modified output 350 comprises a portion 360 that further explains or simplifies the identified portion of the original output as specified in the generated prompt 340, i.e., specified in portion 344 of the generated prompt 340. In this case, the portion 360 further explains electrons and their energy with regard to plant cells. Thus, the user is presented with a simplified or more explanatory output to try to alleviate the user's confusion. It should be appreciated that this process may be repeated with this updated or modified output 350 such that if the updated/modified output 350 is still considered to be confusing to the user, the particular portion of the output 350 determined to elicit a confusion reaction by the user may be identified and another prompt generated to again try to alleviate the confusion on the part of the user. This is all done based on the detection and classification of dynamic passive user reaction information that is automatically collected, analyzed, and identified without the user having to explicitly specify their level of comprehension or emotional state in an input to the system.

Figure 4:
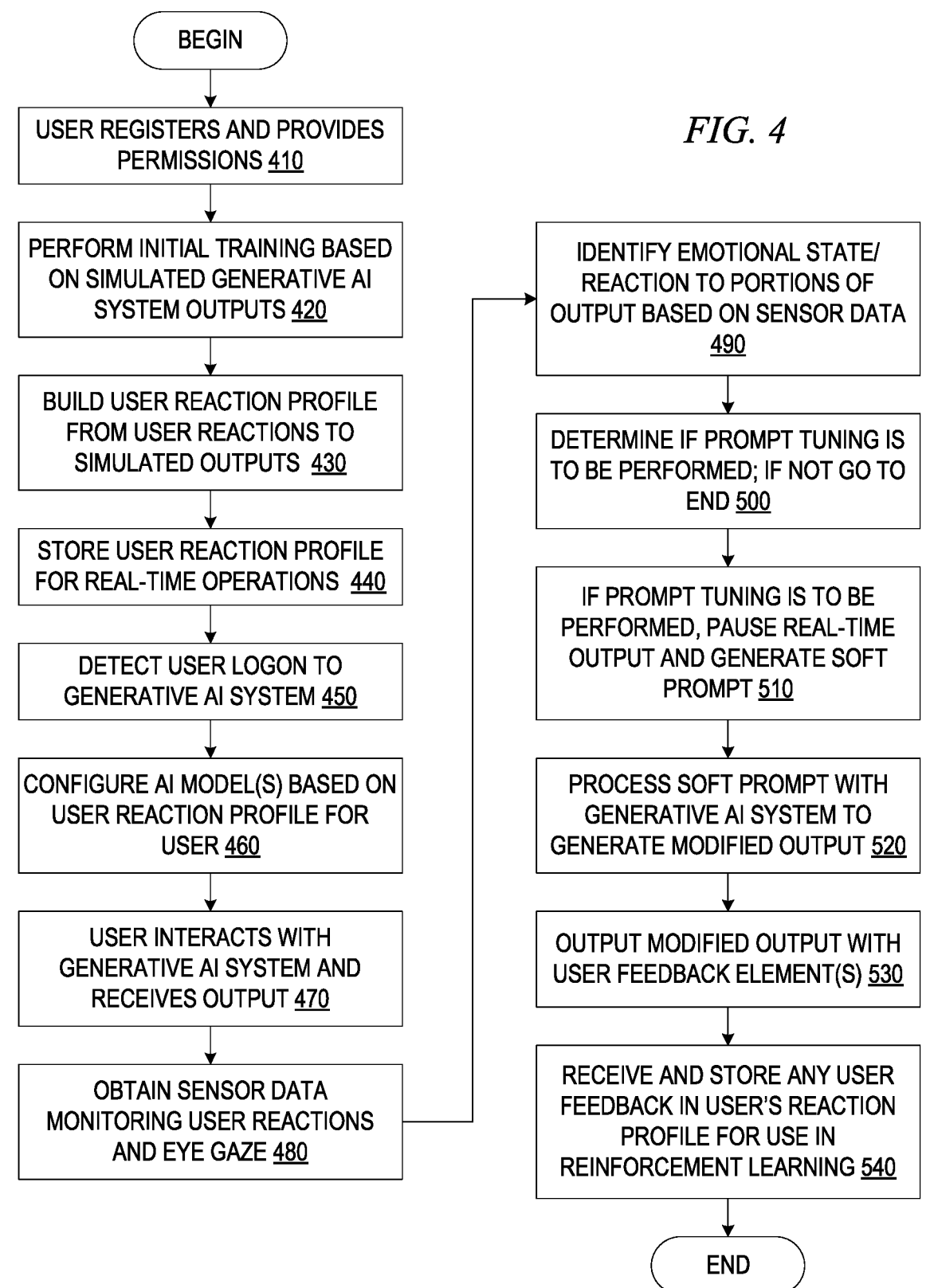
FIG. 4 is a flowchart outlining an example operation of a real-time PaPT system in accordance with one illustrative embodiment.

FIG. 4 is a flowchart outlining an example operation of a real-time PaPT system in accordance with one illustrative embodiment. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 4, and may, in some cases, make use of the results generated as a consequence of the operations set forth in FIG. 4, the operations in FIG. 4 themselves are specifically performed by the improved computing tool in an automated manner.

As shown in FIG. 4, the operation starts with the user registering with the real-time PaPT system and giving permissions to utilize sensors to monitor the user's reactions to output from the generative AI system (step 410). The real-time PaPT system then initiates an initial training operation in which simulated generative AI system responses are presented to the user and the user's emotional state/reactions are captured via the sensors and eye tracking or gaze detection mechanisms (step 420). The eye tracking or gaze detection mechanisms are used to determine the locations of the output focused on and correlate those locations with the user's sensor data for their emotional state/reaction. This information is correlated with the ground truth emotional state/reaction expected to the corresponding portions and thus, the users' captured sensor data is correlated with the expected emotional state/reaction. Based on these correlations, over a plurality of simulated outputs, i.e., training data, the real-time PaPT system builds a user reaction profile having patterns of sensor data indicative of different emotional states/reactions based on the simulated generative AI system responses (step 430). These patterns are used to provide AI model configuration parameters for the user which may be stored as part of the user reaction profile for later use during real-time operation (step 440).

During real-time operation, the user logs onto the generative AI system, which operates in conjunction with, or is integrated with, the real-time PaPT system (step 450). In response to the logon, the real-time PaPT system configures an instance of the AI models for the various systems, e.g., facial expression classification, eye tracking and gaze detection, behavioral biometrics, user reaction classifier, and the like, for the particular user using the configuration information stored in the user reaction profile (step 460). The user interacts with the generative AI system and receives an output from the generative AI system (step 470). The user's eye gaze, facial expression, biometrics, and the like, are all monitored by the sensors while the user is consuming the output from the generative AI system (step 480). The user's emotional state/reaction to the various portions of the output, as identified by the eye gaze tracking, is determined by the various AI models (step 490). This may involve generating scores or probability values for each of a plurality of possible emotional states/reactions from the user. These scores or probability values may be compared to one or more thresholds to determine if one or more thresholds are met or exceeded and indicate a need for prompt tuning of the output from the generative AI system (step 500).

If prompt tuning is determined to be needed, then the real-time output by the generative AI system is paused and a prompt tuning operation is executed in which a prompt is automatically generated by the real-time PaPT system based on the original output, the portion of the output determined to be triggering the prompt tuning, the user reaction profile, and the particular classification of the user's emotional state/reaction (step 510). The prompt is input to the generative AI system which then generates a modified output based on the prompt (step 520). This modified output is an enhanced output that is specifically enhanced based on the user's emotional state or reaction to the original output, e.g., by providing further explanatory content, providing a summary or simplified version of the original output, or the like. The modified output is then presented to the user via their client device, where the modified output may include further user interface elements through which the user may provide feedback as to the correctness/incorrectness of the classification of the user's emotional state/reaction and the satisfactory/unsatisfactory nature of the modified output (step 530). Any user feedback provided may be stored in the user's reaction profile for use in performing additional reinforcement learning of the AI models (step 540). The operation then terminates. It should be appreciated that while the flowchart shows the operation terminating, the operation of steps 470-540 may be repeated continuously while the user is logged onto the generative AI system and interacting with it.

Thus, the illustrative embodiments provide mechanisms for real-time automated monitoring and classification of user reactions to outputs generated by a generative AI system. The illustrative embodiments perform such operations as a background operation seamlessly with regard to the user. The illustrative embodiments provide mechanisms to automatically determine when the user's reaction to output indicates a need for additional or modified content to increase the user's understanding and/or satisfaction with the output generated by the generative AI system. The illustrative embodiments provide mechanisms to automatically generate the additional or modified content by providing a prompt mechanism that triggers the generative AI system to generate the additional or modified content for portions of the original output that the illustrative embodiments determine elicit an emotional response from the user that is less than desired.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for real-time modification of an interaction with an artificial intelligence (AI) computer model based on detected real-time passive responses from a user to content generated by the AI computer model, the method comprising:

responsive to the user consuming an output by the AI computer model as the output by the AI computer model is generated in real-time, recording, by one or more sensors, a dynamic passive user response of the user;

analyzing, by a machine learning trained computer model, the recorded dynamic passive user response in real time to classify the recorded dynamic passive user response with regard to a plurality of predetermined classifications corresponding to different levels of comprehension by the user or user emotional states;

assigning, by the machine learning trained computer model, user scores corresponding to the plurality of predetermined classifications to a portion of the output;

responsive to at least one user score of the assigned user scores exceeding a threshold score, pausing generation of the output by the AI computer model;

in response to pausing the generation of the output by the AI computer model, generating a prompt specific to the portion of the output and a level of comprehension classification or an emotional state classification of the user corresponding to the at least one user score; and resuming generating the output by the AI computer model, from the portion of the output, in response to the AI computer model processing the generated prompt.

2. The method of claim 1, wherein the AI computer model is a generative AI computer model and the output by the AI computer model is a generative AI computer model output comprising natural language content responsive to a user input to the generative AI computer model.

3. The method of claim 1, wherein the at least one user score exceeding the threshold score comprises a confusion score, and wherein the prompt is a soft prompt that summarizes the portion of the output that the user was consuming when the generation of the output by the AI computer model was paused.

4. The method of claim 1, wherein the at least one user score exceeding the threshold score comprises a dissatisfaction score, and wherein the prompt is a soft prompt that addresses the portion of the output that the user was consuming when the generation of the output by the AI computer model was paused, wherein the soft prompt comprises content that addresses the portion of the output by specifying one or more alternative interpretations of the portion of the output.

5. The method of claim 1, further comprising:

visually highlighting the portion of the output in response to the at least one user score exceeding the threshold score, wherein features of the highlighting are specific to a particular user score of the at least one user score that exceeded the threshold score, and wherein different user scores exceeding the threshold score have different features for the highlighting of the portion of the output.

6. The method of claim 1, wherein analyzing the recorded dynamic passive user response in real-time to classify the recorded dynamic passive user response comprises analysis of real-time facial expressions by the machine learning trained computer model to classify the real-time facial expressions of the user into the plurality of predetermined classifications.

7. The method of claim 1, further comprising:

generating and displaying an output-color-coded heatmap of the output by the AI computer model based on the predetermined classifications of the recorded dynamic passive user response correlated with portions of the output.

8. The method of claim 1, further comprising executing one or more eye tracking algorithms on digital images captured by the one or more sensors comprising a front-facing digital image capture device to identify the portion of the output.

9. The method of claim 1, further comprising executing an initial training of the machine learning trained computer model based on initial passive user responses to predefined training data examples of AI computer model output, to generate baseline user responses for different ones of the predetermined classifications, wherein the user scores are assigned to the portion of the output based on the baseline user responses for the different ones of the predetermined classifications.

10. The method of claim 1, wherein the prompt is a soft prompt or a prefix prompt.

11. A computer program product comprising a computer readable storage medium having a computer readable program stored therein, wherein the computer readable program, when executed on a computing device, causes the computing device to perform real-time modification of an interaction with an artificial intelligence (AI) computer model based on detected real-time passive responses from a user to content generated by the AI computer model, at least by:

recording by one or more sensors, responsive to the user consuming an output by the AI computer model as the output by the AI computer model is generated in real-time, a dynamic passive user response of the user;

analyzing, by a machine learning trained computer model, the recorded dynamic passive user response in real time to classify the recorded dynamic passive user response with regard to a plurality of predetermined classifications corresponding to different levels of comprehension by the user or user emotional states;

assigning, by the machine learning trained computer model, user scores corresponding to the plurality of predetermined classifications to a portion of the output by the AI computer model;

responsive to at least one user score of the assigned user scores exceeding a threshold score, pausing generation of the output by the AI computer model;

in response to pausing the generation of the output by the AI computer model, generating a prompt specific to the portion of the output and a level of comprehension classification or an emotional state classification of the user corresponding to the at least one user score; and resuming generating the output by the AI computer model, from the portion of the output, in response to the AI computer model processing the generated prompt.

12. The computer program product of claim 11, wherein the AI computer model is a generative AI computer model and the output by the AI computer model is a generative AI computer model output comprising natural language content responsive to a user input to the generative AI computer model.

13. The computer program product of claim 11, wherein the at least one user score exceeding the threshold score comprises a confusion score, and wherein the prompt is a soft prompt that summarizes the portion of the output that the user was consuming when the generation of the output by the AI computer model was paused.

14. The computer program product of claim 11, wherein the at least one user score exceeding the threshold score comprises a dissatisfaction score, and wherein the prompt is a soft prompt that addresses the portion of the output that the user was consuming when the generation of the output by the AI computer model was paused, wherein the soft prompt comprises content that addresses the portion by specifying one or more alternative interpretations of the portion of the output.

15. The computer program product of claim 11, wherein the computer readable program further causes the computing device to:

visually highlight the portion of the output in response to the at least one user score exceeding the threshold score, wherein features of the highlighting are specific to a particular user score of the at least one user score that exceeded the threshold score, and wherein different user scores exceeding the threshold score have different features for the highlighting of the portion of the output.

16. The computer program product of claim 11, wherein analyzing the recorded dynamic passive user response in real-time to classify the recorded dynamic passive user response comprises analysis of real-time facial expressions by the machine learning trained computer model to classify the real-time facial expressions of the user into the plurality of predetermined classifications.

17. The computer program product of claim 11, wherein the computer readable program further causes the computing device to:

generate and display an output-color-coded heatmap of the output by the AI computer model based on the predetermined classifications of the recorded dynamic passive user response correlated with portions of the output by the AI computer model.

18. The computer program product of claim 11, wherein the computer readable program further causes the computing device to execute one or more eye tracking algorithms on digital images captured by the one or more sensors comprising a front-facing digital image capture device to identify the portion of the output.

19. The computer program product of claim 11, wherein the computer readable program further causes the computing device to execute an initial training of the machine learning trained computer model based on initial passive user responses to predefined training data examples of AI computer model output, to generate baseline user responses for different ones of the predetermined classifications, wherein the user scores are assigned to the portion of the output based on the baseline user responses for the different ones of the predetermined classifications.

20. An apparatus comprising:

at least one processor; and at least one memory coupled to the at least one processor, wherein the at least one memory comprises instructions which, when executed by the at least one processor,
cause the at least one processor to perform real-time
modification of an interaction with an artificial intelli-
gence (AI) computer model based on detected real-time
passive responses from a user to content generated by
the AI computer model, at least by:

recording by one or more sensors, responsive to the user
consuming an output from the AI computer model as it
is generated in real-time, a dynamic passive user
response of the user;

analyzing, by a machine learning trained computer model,
the recorded dynamic passive user response in real time
to classify the recorded dynamic passive user response
with regard to a plurality of predetermined classifica-
tions corresponding to different levels of comprehen-
sion by the user or user emotional states;

assigning, by the machine learning trained computer
model, user scores corresponding to the plurality of
predetermined classifications to a portion of the output;

responsive to at least one user score of the assigned user
scores exceeding a threshold score, pausing generation
of the output;

in response to pausing the generation of the output,
generating a prompt specific to the portion of the output
and a level of comprehension classification or an emo-
tional state classification of the user corresponding to
the at least one user score; and resuming generating the output, from the portion of the
output, in response to the AI computer model process-
ing the generated prompt.

* * * * *